United States Patent
Bruvelaitis et al.

(10) Patent No.: US 6,366,445 B1
(45) Date of Patent: Apr. 2, 2002

(54) CARTRIDGE CAPACITOR AND METHOD OF MANUFACTURING THE SAME

(75) Inventors: Sigmund Bruno Alexander Bruvelaitis, El Paso, TX (US); Juan Antonio Rojas Rosales, Chihuahua (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/285,266

(22) Filed: Apr. 2, 1999

(51) Int. Cl.[7] .......................... H01G 9/04; H01G 4/228; H01G 9/10; H01G 9/00; H05K 5/03
(52) U.S. Cl. ...................... 361/511; 361/520; 29/25.03
(58) Field of Search ................ 361/503–510, 361/511–522, 274.1–274.3; 29/25.03

(56) References Cited

U.S. PATENT DOCUMENTS

| | | | | |
|---|---|---|---|---|
| 1,580,873 A | * | 4/1926 | Weldon | 361/308.1 |
| 3,483,448 A | * | 12/1969 | Robinson | 361/274.2 |
| 4,536,819 A | * | 8/1985 | Deutsch | 361/274.3 |
| 4,546,415 A | * | 10/1985 | Kent et al. | 361/511 |
| 5,392,191 A | * | 2/1995 | Thomas et al. | 361/508 |
| 5,549,989 A | * | 8/1996 | Anani | 429/306 |
| 5,994,000 A | * | 11/1999 | Ein-Eli et al. | 429/332 |

FOREIGN PATENT DOCUMENTS

GB       2056774       5/1981

* cited by examiner

Primary Examiner—Dean A. Reichard
Assistant Examiner—Eric W. Thomas
(74) Attorney, Agent, or Firm—Hunton & Williams

(57) ABSTRACT

A cartridge capacitor, such as floating cathode electrolytic capacitor, having anodes, a floating cathode, and electrolytic layers rolled into a cartridge. Consecutive turns of the floating cathode are connected together by a conductor to reduce generated heat and to improve heat dissipation. An anode at outer turns of the capacitor is smaller in area than an anode at inner turns of the capacitor to reduce heat generated at the inner turns. The anodes can be made of an amorphous oxide foil.

45 Claims, 1 Drawing Sheet

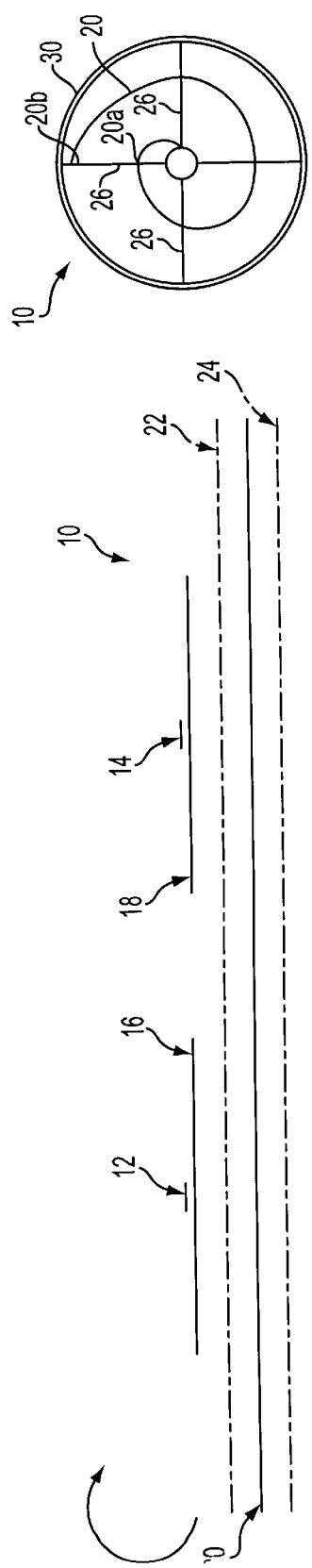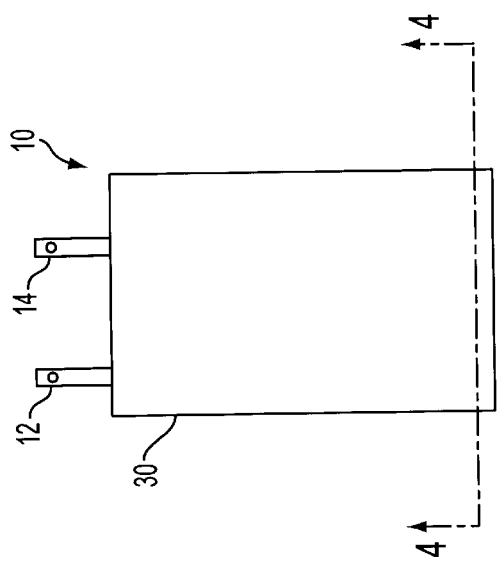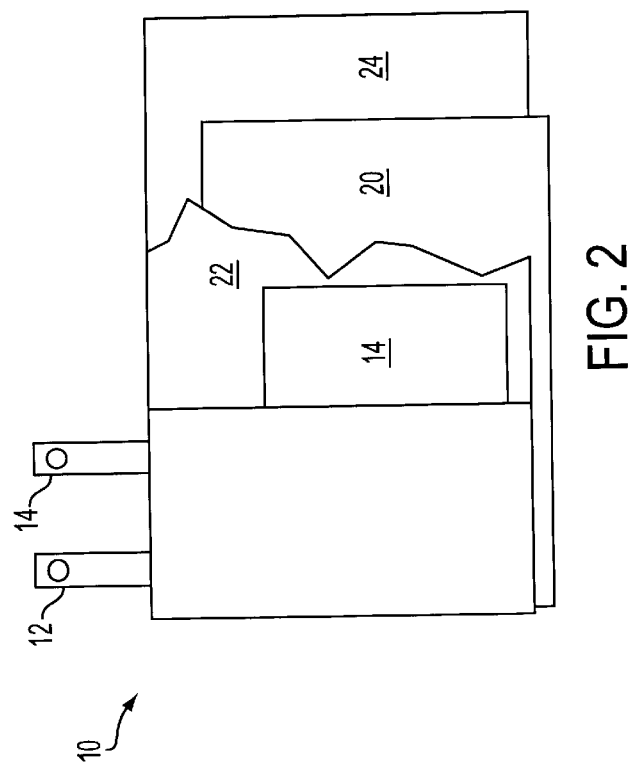

CARTRIDGE CAPACITOR AND METHOD OF MANUFACTURING THE SAME

BACKGROUND OF THE INVENTION

The invention relates to capacitors. More particularly, the invention relates to capacitors that are rolled into cylindrical cartridges.

A capacitor is a standard passive electronic circuit component including, in its simplest form, two conducting electrodes or plates separated by a dielectric insulator. Capacitors are used in various applications. One common application for capacitors is electric motors. "Motor-start capacitors" are coupled in series to an auxiliary winding of an induction motor and the series circuit of the capacitor and auxiliary winding are used to aid starting the motor and disconnected after a startup period. "Motor-run capacitors" are connected together with an auxiliary winding in parallel to the main winding of an induction motor to boost the power factor of the motor. Generally, motor-run capacitors and motor start capacitors must be quite large and thus are expensive to manufacture.

Electrolytic capacitors include an oxide film as a dielectric. The oxide film is formed by anodically oxidizing an electrode foil made of aluminum, tantalum, titanium, niobium, or the like, to make a "formed" foil and placing the formed foil in opposition to an electrolyte, in the form of a paste for example. The electrolyte can be used as the second electrode or the electrolyte can couple the formed foil to another foil or plate to be used as an electrode. Typically, the formed foil is coated with the electrolyte paste and rolled into a cylindrical cartridge of successive turns. Alternatively, the electrolyte can be impregnated in an absorbent layer, such as a paper layer, by dipping the capacitor cartridge in an electrolyte until the electrolyte is absorbed in the absorbent layer. Because the oxide film is tin, a high capacitance value is realized in a small physical volume. In some motor applications having a short operating cycle, robust electrolytic capacitors are used as motor run capacitors to take advantage of their compact dimensions and lower manufacturing cost.

Floating cathode electrolytic capacitors are known in which an electrically movable "unformed" electrode foil, is disposed between two formed electrode foils and coupled to the formed electrode foils by electrolyte layers. The phrase "formed electrode" as used herein refers to an electrode having an oxide formed thereon by application of an external voltage. The phrase "unformed electrode" as used herein refers to an electrode having only a natural oxide film thereon. The phrase "electrically movable", as used herein, refers to an electrode that is not directly coupled to any source of electric charge but is charged based only on polarization of other elements in the capacitor. Floating cathode electrolytic capacitors reduce harmful cathodic reactions and deterioration of oxide film properties as compared to standard electrolytic capacitors not having a floating cathode. The general construction of floating cathode electrolytic capacitors is well known. For example, published patent application GB 2056774A discloses an example of a floating cathode electrolytic capacitor.

However, electrolytic capacitors and floating cathode electrolytic capacitors exhibit several limitations. First, such capacitors are not suited for heavy duty type motor-start and motor-run applications because of the extended AC cycle times required in most applications. Specifically, electrolytic capacitors and floating cathode electrolytic capacitors have relatively poor heat dissipation because most portions of the electrodes are covered, i.e. are not on the outside of the cylindrical cartridge. The poor heat dissipation characteristics cause overheating in central portions of the capacitor when used at or near its intended rating, thus causing excess drying in central portions of the capacitor and eventually failure of the capacitor. Because of the limitations noted above, conventional electrolytic capacitors must be oversized for motor applications, even when the operating cycle is short.

SUMMARY OF THE INVENTION

The invention relates to a cartridge capacitor having an increased operating life. A first aspect of the invention is a floating cathode electrolytic capacitor of the type having plural layers superposed on one another and subsequently rolled into a cylindrical cartridge. The capacitor comprises a first layer of an electrolyte material, a second layer of a floating cathode, a third layer of an electrolyte material, and a fourth layer of an anode, constructed of an amorphous oxide foil. The first layer, the second layer, the third layer, and the fourth layer are rolled into a cylindrical cartridge of successive turns.

A second aspect of the invention is a floating cathode electrolytic capacitor of the type having plural layers superposed on one another and subsequently rolled into a cylindrical cartridge. The capacitor comprises a first layer of an electrolyte material, a second layer of a floating cathode, a third layer of an electrolyte material, a fourth layer of an anode, and a conductor coupled to said floating cathode. The first layer; the second layer, the third layer, and the fourth layer are rolled into a cylindrical cartridge of successive turns. The conductor couples turns of the cathode to one another.

A third aspect of the invention is a floating cathode electrolytic capacitor of the type having plural layers superposed on one another and subsequently rolled into a cylindrical cartridge. The capacitor comprises a first layer of an electrolyte material, a second layer of a floating cathode, a third layer of an electrolyte material, and a fourth layer of two anodes, a first of said anodes having an area that is greater than an area of a second of said anodes. The first layer, second layer, third layer, and fourth layer are rolled into a cylindrical cartridge of successive turns. The first of the anodes is disposed in inner turns of the cartridge and the second of the anodes is disposed in outer turns of the cartridge.

A fourth aspect of the invention is a method of manufacturing a floating cathode electrolytic capacitor of the type having plural layers superposed on one another and subsequently rolled into a cylindrical cartridge. The method comprises the steps of providing a first layer of an electrolyte material, providing a second layer of a floating cathode, providing a third layer of an electrolyte material, providing a fourth layer of an anode constructed of amorphous oxide foil, superposing the first layer, the second layer, the third layer, and the fourth layer in order on one another, and rolling the first layer, the second layer, the third layer, and the fourth layer into a cylindrical cartridge of successive turns.

A fifth aspect of the invention is a method of manufacturing a floating cathode electrolytic capacitor of the type having plural layers superposed on one another and subsequently rolled into a cylindrical cartridge. The method comprises the steps of providing a first layer of an electrolyte material, providing a second layer of a floating cathode, providing a third layer of an electrolyte material, providing a fourth layer of two anodes, a first of the anodes having an area that is larger than a second of the anodes, superposing the first layer, the second layer, the third layer, and the fourth layer in order on one another, and rolling the first layer, the second layer, the third layer, and the fourth layer into a cylindrical cartridge of successive turns. The first of the anodes is disposed in inner turns of the cartridge and the second of the anodes is disposed in outer turns of the cartridge.

A sixth aspect of the invention is a method of manufacturing a floating cathode electrolytic capacitor of the type having plural layers superposed on one another and subsequently rolled into a cylindrical configuration. The method comprises the steps of, providing a first layer of an electrolyte material, providing a second layer of a floating cathode, providing a third layer of an electrolyte material, providing a fourth layer of an anode, superposing the first layer, the second layer, the third layer, and the fourth layer in order on one another, rolling the first layer, the second layer, the third layer, and the fourth layer into a cylindrical cartridge of successive turns, and coupling turns of the floating cathode to each other by a conductor.

A seventh aspect of the invention is a capacitor of the type having plural elements superposed on one another and subsequently rolled into a cylindrical cartridge. The capacitor comprises a cathode, a dielectric material, an anode, and a conductor coupled to the cathode. The cathode, the dielectric material, and the anode, are rolled into a cylindrical cartridge of successive turns the conductor couples turns of the cathode to each other.

An eighth aspect of the invention is a method of manufacturing a capacitor of the type having plural elements superposed on one another and subsequently rolled into a cylindrical cartridge. The method comprises the steps of providing a cathode, providing a dielectric material, providing an anode, forming a conductor on the cathode, and rolling the cathode, the dielectric material, and the anode into a cylindrical cartridge of successive turns. The conductor couples turns of the cathode to each other.

A ninth aspect of the invention is a method of manufacturing a capacitor of the type having plural elements superposed on one another and subsequently rolled into a cylindrical cartridge. The method comprises the steps of providing a cathode, providing a dielectric material, providing two anodes, setting an area of a first of the anodes to be greater than an area of a second of said anodes, and rolling the cathode, the dielectric material, and the anodes into a cylindrical cartridge of successive turns. The first of the anodes is disposed in inner turns of the cartridge and the second of the anodes is disposed in outer turns of the cartridge.

BRIEF DESCRIPTION OF THE DRAWING

The invention will be described through a preferred embodiment and the attached drawing in which similar elements are labeled with like reference numerals and in which:

FIG. 1 is a schematic illustration of the layers of a capacitor of the preferred embodiment;

FIG. 2 is a plan view, partially cut away, of the layers of FIG. 1 partially rolled into a cylindrical cartridge;

FIG. 3 is a plan view of the capacitor of the preferred embodiment; and

FIG. 4 is a sectional view taken along line 4—4 in FIG. 3 with some layers omitted for clarity.

DETAILED DESCRIPTION OF THE PREFERRED EMBODIMENT

FIG. 1 is a schematic illustration of the preferred embodiment illustrating the various layers prior to being rolled into a cartridge. Electrolytic capacitor 10 comprises 4 layers superposed over one another. A first layer includes electrolyte 24. The first layer preferably is an absorbent material, such as paper, having an electrolyte therein. However, the first layer can be made of an electrolyte paste or any other type of electrolyte with or without a carrier or matrix. A second layer is floating cathode 20 that is not directly coupled to any source of electrical charge. Floating cathode 20 preferably is made of a high gain aluminum foil, such as KAPPA 204™ manufactured by BECROMAL™ or SATMA C267-2™. A third layer, similar to the first layer, includes electrolyte 22. The third layer preferably is an absorbent material, such as paper, having an electrolyte therein. However, the third layer can be made of an electrolyte paste or any other type of electrolyte with or without a carrier or matrix. A fourth layer includes anode 16 and anode 18 having respective terminals 12 and 14. Anode 16 and anode 18 preferably are made of an amorphous oxide foil, such as type S249TM manufactured by SATMA™, which is a high purity aluminum anode foil, and have an oxide film formed thereon to serve as the dielectric of capacitor 10.

The layers are then rolled, as indicated by the arrow in FIG. 1, into a cylindrical form, i.e. a cartridge, of successive turns and optionally placed in housing 30, such as an aluminum can, as illustrated in FIG. 3. However, prior to insertion of the cartridge into housing 30, conductors 26 are formed on floating cathode 20 to couple successive turns 20a and 20b of floating cathode 20 to one another, as illustrated in FIG. 4. Conductors 26 of the preferred embodiments are electrical and thermal conductors and are only connected to floating cathode 20 (and optionally to housing 30). The term "conductor" as used herein refers to any material that allows electrical charge and/or heat energy to move therethrough. There can be only one conductor 26 or plural conductors 26. Conductors 26 can be of any appropriate material such as wire, metal strips, or other conductive materials. Further, conductors 26 can merely be portions of floating cathode 20 which are pressed, deformed, or otherwise joined together. For example, after the cartridge is rolled, an edge of floating cathode 20 which extends beyond electrolyte 22, electrolyte 24, anode 16, and anode 18, as illustrated in FIG. 2, can be contacted by an abrasive wheel to deform portions of the lower edge thereof to place the portions in contact with one another and thereby define conductors 26. Housing 30, if made of an electrically and thermally conductive material, can serve as conductors 26 merely by contacting an edge of floating cathode 20 after insertion of the cartridge into housing 30. Conductors 26 can be formed and attached in any manner, such as by welding a conductive material to bottom edges of floating cathode 20. A protective and insulative sleeve can be placed around housing 30 if housing 30 is conductive. Note that FIG. 4 omits the first, third, and fourth layers for clarity. Also, there can be more or less turns of each layer than are illustrated in FIG. 4.

Conductors 26 serve to remove heat from the central turns, e.g. turn 20b, of capacitor 10. Further, conductors 26 lower the internal electrical resistance of the capacitor thereby reducing the $I^2R$ loss of the capacitor and reducing heat generated by the capacitor. Accordingly, conductors 26 reduce heat generated by the capacitor and dissipate any generated heat more efficiently. As noted above, failure of electrolytic capacitors is typically due to excess drying of the electrolyte in central turns of the capacitor due to heat buildup in central turns of the capacitor. Therefore, reducing generated heat and increasing heat dissipation extends the life of the capacitor. Conductor 26 can couple turns of the cathode or turns of the anode.

Capacitor 10 comprises two effective capacitors in series. In particular, one effective capacitor is comprised of anode 16 electrolyte 22 and floating cathode 20. The other effective capacitor is comprised of floating cathode 20, electrolyte 24, and anode 18. As illustrated in FIG. 1, anode 18 will be located in outer turns of the cartridge of capacitor 10 and has an area that is set to be less than anode 16 that will be located at inner turns of the cartridge of capacitor 10. The reduced area of anode 18 is shown as a reduced length along the cartridge in FIG. 1. However, the area can be reduced by reducing the width of anode 18. Since capacitor 10 is effectively two capacitors in series, as noted above, the current through the two effective capacitors is the same. Therefore, less current per area will be present in anode 16 located at inner turns of the cartridge of capacitor 10 than at anode 18 located in outer turns of capacitor 10. Therefore, heat stress is shifted away from the inner turns to the outer turns to further avoid failure due to drying in the central turns of capacitor 10 thereby extending the life of the capacitor.

It can be seen that the invention provides a cartridge capacitor having better thermal properties and thus an extended life. The invention can be applied to any electrolytic capacitor construction or to any rolled cartridge capacitor. The invention can have various layers of electrodes, electrolytes, and dielectric materials. Layers can be omitted if appropriate. Various materials can be used as electrodes and as a dielectric.

The invention has been described through a preferred embodiment. However, various modifications can be made without departing from the scope of the invention as defined by the appended claims.

What is claimed is:

1. A floating cathode electrolytic capacitor of the type having plural layers superposed on one another and subsequently rolled into a cylindrical cartridge, said capacitor comprising:
   a first layer of an electrolyte material;
   a second layer of a floating cathode;
   a third layer of an electrolyte material;
   a fourth layer of an anode, said anode being constructed of an amorphous oxide foil having an oxide film thereon; and
   wherein said first layer, said second layer, said third layer, and said fourth layer are rolled into a cylindrical cartridge of successive turns.

2. A capacitor as recited in claim 1, wherein said fourth layer comprises two anodes, each of said anodes being constructed of an amorphous oxide foil.

3. A capacitor as recited in claim 2, wherein said first layer and said third layer each include an absorbent material having an electrolyte therein.

4. A capacitor as recited in claim 2, wherein said floating cathode is constructed of a high gain aluminum foil.

5. A capacitor as recited in claim 2, wherein the area of a first of said anodes disposed in outer turns of the cartridge is less than the area of a second of said anodes disposed in inner turns of the cartridge.

6. A capacitor as recited in claim 2, wherein turns of said second layer are coupled to each other by a conductor.

7. A capacitor as recited in claim 6, wherein said conductor is defined by portions of said floating cathode that are deformed to be in contact with one another.

8. A capacitor as recited in claim 1, further comprising a housing surrounding the cylindrical cartridge.

9. A floating cathode electrolytic capacitor of the type having plural layers superimposed on one another and subsequently rolled into a cylindrical cartridge, said capacitor comprising:
   a first layer of an electrolyte material;
   a second layer of a floating cathode;
   a third layer of an electrolyte material
   a fourth layer of an anode having an oxide film thereon;
   a conductor coupled to said floating cathode; and
   wherein said first layer, said second layer, said third layer, and said fourth layer are rolled into a cylindrical cartridge of successive turns and said conductor couples turns of said floating cathode to each other; and
   wherein said conductor is defined by portions of said floating cathode that are deformed to be in contact with one another.

10. A capacitor as claimed in claim 9 wherein said fourth layer comprises two anodes.

11. A capacitor as recited in claim 10, wherein said first layer and said third layer each include an absorbent material having an electrolyte therein.

12. A capacitor as recited in claim 10, wherein said floating cathode is constructed of a high gain aluminum foil.

13. A capacitor as recited in claim 10, wherein the area of a first of said anodes disposed in outer turns of the cartridge is less than the area of a second of said anodes disposed in inner turns of the cartridge.

14. A capacitor as recited in claim 10, further comprising a housing surrounding the cylindrical cartridge.

15. A floating cathode electrolytic capacitor of the type having plural layers superposed on one another and subsequently rolled into a cylindrical cartridge, said capacitor comprising:
   a first layer of an electrolyte material;
   a second layer of a floating cathode;
   a third layer of an electrolyte material;
   a fourth layer consisting of two anodes having an oxide film thereon, a first of said anodes having an area that is greater than an area of a second of said anodes; and
   wherein said first layer, said second layer, said third layer, and said fourth are rolled into a cylindrical cartridge of successive turns, said first of said anodes being disposed in inner turns of the cartridge and said second of said anodes being disposed in outer turns of the cartridge.

16. A capacitor as recited in claim 15, wherein said first layer and said third layer each include an absorbent material having an electrolyte therein.

17. A capacitor as recited in claim 15, wherein said floating cathode is constructed of a high gain aluminum foil.

18. A capacitor as recited in claim 15, wherein the turns of said floating cathode are coupled to each other by a conductor.

19. A capacitor as recited in claim 18, wherein said conductor is defined by portions of said floating cathode that are deformed to be in contact with one another.

20. A capacitor as recited in claim 15, further comprising a housing surrounding the cartridge.

21. A method of manufacturing a floating cathode electrolytic capacitor of the type having plural layers superposed on one another and subsequently rolled into a cylindrical cartridge, said method comprising the steps of:

provinding a first layer of an electrolyte material;

providing a second layer of a floating cathode;

providing a third layer of an electrolyte material;

providing a fourth layer of an anode, constructed of an amorphous oxide foil having an oxide film thereon;

superposing the first layer, the second layer, the third layer, and the fourth layer in order on one another; and rolling the first layer, the second layer, the third layer, and the fourth layer into a cylindrical cartridge of successive turns.

22. A method as recited in claim 21, wherein said step of providing a fourth layer comprises providing two anodes constructed of an amorphous oxide foil having an oxide film thereon.

23. A method as recited in claim 22, wherein said step of providing a fourth layer comprises setting the area of one of the anodes to be disposed in outer turns of the cartridge after said rolling step to be less than the area of another of the anodes to be disposed in inner turns of the cartridge after said rolling step.

24. A method as recited in claim 21, wherein said steps of providing the first layer and providing the third layer each comprise providing an absorbent material and introducing an electrolyte into the absorbent material.

25. A method as recited in claim 21, wherein, in said step of providing a second layer, the floating cathode is constructed of a high gain aluminum foil.

26. A method as recited in claim 21, further comprising the step of coupling turns of the floating cathode to each other by a conductor.

27. A method as recited in claim 26, wherein said step of coupling comprises deforming portions of the floating cathode to be in contact with one another.

28. A method as recited in claim 27, wherein said step of deforming comprises contacting edge portions of the floating cathode with an abrasive rotating wheel.

29. A method as recited in claim 21, further comprising the step of disposing a housing around the cartridge.

30. A method of manufacturing a floating cathode electrolytic capacitor of the type having plural layers superposed on one another and subsequently rolled into a cylindrical cartridge, said method comprising the steps of:

providing a first layer of an electrolyte material;

providing a second layer of a floating cathode;

providing a third layer of an electrolyte material;

providing a fourth layer consisting of two anodes having an oxide film thereon, a first of the anodes having an area that is larger than a second of the anodes;

superposing the first layer, the second layer, the third layer, and the fourth layer in order on one another; and rolling the first layer, the second layer, the third layer, and the fourth layer into a cylindrical cartridge of successive turns, the first of the anodes being disposed in inner turns of the cartridge and the second of the anodes being disposed in outer turns of the cartridge.

31. A method as recited in claim 30, wherein said steps of providing the first layer and providing the third layer each comprise providing an absorbent material and introducing an electrolyte into the absorbent material.

32. A method as recited in claim 30, wherein, in said step of providing a second layer, said floating cathode is constructed of a high gain aluminum foil.

33. A method as recited in claim 30, further comprising the step of coupling turns of the second layer to each other by an electrical and thermal conductor.

34. A method as recited in claim 33, wherein said step of coupling comprises deforming portions of the floating cathode to be in contact with one another.

35. A method as recited in claim 34, wherein said step of deforming comprises contacting edge portions of the floating cathode with an abrasive rotating wheel.

36. A method as recited in claim 30, further comprising the step of disposing a housing around the cartridge.

37. A method of manufacturing a floating cathode electrolytic capacitor of the type having plural layers superposed on one another and subsequently rolled into a cylindrical cartridge, said method comprising the steps of:

providing a first layer of an electrolyte material;

providing a second layer of a floating cathode;

providing a third layer of an electrolyte material;

providing a fourth layer of an anode having an oxide film thereon;

superposing the first layer, the second layer, the third layer, and the fourth layer in order on one another;

rolling the first layer, the second layer, the third layer, and the fourth layer into a cylindrical cartridge of successive turns; and coupling the turns of the floating cathode to each other by a conductor; and wherein said step of coupling comprises contacting edge portions of the floating cathode to be in contact with one another.

38. A method as recited in claim 37, wherein said step of providing a fourth layer comprises providing two anodes having oxide film thereon.

39. A method as recited in claim 37, wherein said steps of providing the first layer and providing the third layer each comprise providing an absorbent material and introducing an electrolyte into the absorbent material.

40. A method as recited in claim 37, wherein, in the step of providing the second layer, said floating cathode is constructed of high gain aluminum foil.

41. A method as recited in claim 37, wherein said step of deforming comprises contacting edge portions of the floating cathode with an abrasive rotating wheel.

42. A method of manufacturing a cylindrical capacitor comprising plural elements superposed on one another, comprising the steps of:

forming a conductor on one of a cathode or an anode; and rolling the cathode, a dielectric material, and the anode into a cylindrical cartridge of successive turns of the cathode, the dielectric material, and the anode;

wherein the conductor couples turns of the one of the cathode and the anode to each other.

43. A cartridge capacitor comprising:

a first layer comprising an electrolyte material;

a second layer comprising a floating cathode;

a third layer comprising an electrolyte material;

a fourth layer comprising an amorphous oxide foil anode having an oxide film thereon; and wherein the first layer, the second layer, the third layer, and the fourth layer define a plurality of successive turns.

44. A cartridge capacitor comprising:

a first layer comprising an electrolyte material;

a second layer comprising a floating cathode;

a third layer comprising an electrolyte material;

a fourth layer consisting of a first anode and a second anode, the first anode having an area greater than an area of the second anode; and wherein the first layer, the second layer, the third layer, and the fourth layer define a plurality of successive turns and the first anode defines at least a portion of an inner turn and the second anode defines at least a portion of an outer turn.

45. A cartridge capacitor comprising:

a first layer comprising an electrolyte material;

a second layer comprising a floating cathode;

a third layer comprising an electrolyte material;

a fourth layer comprising an anode having an oxide film thereon; and wherein the first layer, the second layer, the third layer, and the fourth layer define a plurality of successive turns and the second layer defines at least one conductor between adjacent turns of the second layer.

* * * * *